United States Patent
Bagarelli et al.

(10) Patent No.: US 7,916,441 B2
(45) Date of Patent: Mar. 29, 2011

(54) DEVICE FOR PROTECTING ELECTRONIC CIRCUITS AGAINST FAULTS

(75) Inventors: Fulvio Giacomo Bagarelli, Milan (IT); Vincenzo Marano, Cinisello Balsamo (IT); Cristiana Scaramel, Novi Ligure (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 129 days.

(21) Appl. No.: 12/237,236

(22) Filed: Sep. 24, 2008

(65) Prior Publication Data
US 2009/0080131 A1    Mar. 26, 2009

(30) Foreign Application Priority Data
Sep. 25, 2007   (IT) .................................. MI07A1846

(51) Int. Cl.
*H02H 3/00* (2006.01)
(52) U.S. Cl. ........................................................ 361/78
(58) Field of Classification Search ...................... 361/78
See application file for complete search history.

(56) References Cited

U.S. PATENT DOCUMENTS

| | | | |
|---|---|---|---|
| 4,829,199 A * | 5/1989 | Prater | 326/27 |
| 7,468,619 B2 * | 12/2008 | Okuda | 327/108 |
| 2007/0146952 A1 * | 6/2007 | Asada et al. | 361/100 |
| 2008/0018177 A1 * | 1/2008 | Su et al. | 307/130 |
| 2009/0021232 A1 * | 1/2009 | Ishino | 323/288 |

* cited by examiner

*Primary Examiner* — Jared J Fureman
*Assistant Examiner* — Ann T Hoang
(74) *Attorney, Agent, or Firm* — Lisa K. Jorgenson; William J. Pigott; Seed IP Law Group PLLC

(57) ABSTRACT

A protection device for protecting an electronic circuit against a fault is described. The electronic circuit includes an output stage for driving a load and a driving circuit for driving the output stage. The driving circuit is configured to produce a drive signal in response to at least one input signal. The protection device includes a gating circuit and control means. The gating circuit has a first input configured to receive the drive signal, a second input configured to receive a control signal, and an output configured to activate and deactivate the output stage based on the drive signal and control signal. The control means produce the control signal in response to a detection signal representative of detection of the fault either of the load or of the output stage.

20 Claims, 3 Drawing Sheets

DEVICE FOR PROTECTING ELECTRONIC CIRCUITS AGAINST FAULTS

BACKGROUND

1. Technical Field

The present invention relates to a device for protecting electric circuits against faults, specifically for switching power electronic circuits.

2. Description of the Related Art

Devices for protecting various types of integrated electronic circuits, specifically for integrated power circuits of the switching type, are known in the state of the art. Said devices control the turning off of the transistors of the integrated power circuits in response to a fault of the power circuit itself. For example, as shown in FIG. 1, the power stage of an integrated circuit may include a half-bridge with two power transistors, one high side HS and one low side LS, arranged between a power voltage Vdd and ground GND and appropriately driven by a driving circuit 1. In turn, the two transistors drive a load 2 consisting, for example, of a motor. The driving circuit 1 normally supplies the signals to the transistors LS and HS to switch them on or off.

The power stage may suffer faults during its use, e.g., overcurrent, overvoltage, or excessive temperature. For such a reason, a protection circuit is normally inserted. Said protection circuit includes a fault detector 4 and a circuit which operates on the driving circuit of the power stage in response to the detection of the fault. The action operated by the protection circuit is normally that of causing the shutdown of the power stage by means of an input signal SD into the circuit 1.

The protection circuit in FIG. 1 normally includes a comparator 3 which is adapted to compare the signal CIN detected by the fault detector with a reference signal REF, and is adapted to drive a MOS transistor M arranged between the input terminal of the circuit 1, at which the shutdown signal SD is present, and the ground GND. When the signal CIN is higher than the signal REF, the transistor M is switched on and the signal SD, i.e., the signal for turning off the transistors of the power stage, is taken to a low level, i.e., to ground GND.

A problem of such a protection circuit is due to the delay to take the SD signal to a low level. Indeed, an external network, including a resistor R connected to the power voltage Vdd and a capacitor C connected to ground GND, is connected to the drain terminal of the transistor M and thus the signal SD is switched to a low level according to the time constant $Ron\_M*C$, wherein $Ron\_M$ is the switch-on resistance of the transistor M. In such a manner, the shutdown signal SD will be sent to the control circuit of the power stage with a certain delay from said time constant which depends on the external network. As a result, the selection of a high-value external capacitive component C is used but, on the other hand, the capacity of taking current of the transistor M limits the maximum obtainable value of the external capacitive component. Therefore, the protection circuit intervention always occurs with a certain delay after detecting the fault, and said delay may cause faults to the power stage.

BRIEF SUMMARY

In light of the state of the art, one embodiment provides a circuit for protecting electronic circuits against faults which overcomes the aforesaid drawback.

One embodiment is a device for protecting an electronic circuit against a fault, said electronic circuit including an output stage for driving a load and a driving circuit of said output stage adapted to drive the output stage in response to at least one input signal, said protection device being adapted to determine the shutdown of the output stage in response to a signal indicating the detection of a fault either of the load or of the output stage. The device includes digital means configured to minimize the time delay between the detection of the fault and the shutdown of the output stage.

One embodiment provides a device for protecting electronic circuits which immediately shuts down the output stage by preventing faults either to the same or to the applied load due to the delay in the protective action of the device, because the intervention time of the protection device does not depend on the applied external network.

Furthermore, the new circuit architecture of the protection device allows a protection time interval in accordance with a desired value, by modifying the value of the external network.

BRIEF DESCRIPTION OF THE SEVERAL VIEWS OF THE DRAWING(S)

The features of embodiments of the present invention will be apparent from the following detailed description of a practical embodiment thereof, shown by way of non-limitative example in the accompanying drawings, in which.

DETAILED DESCRIPTION

Figure 2:
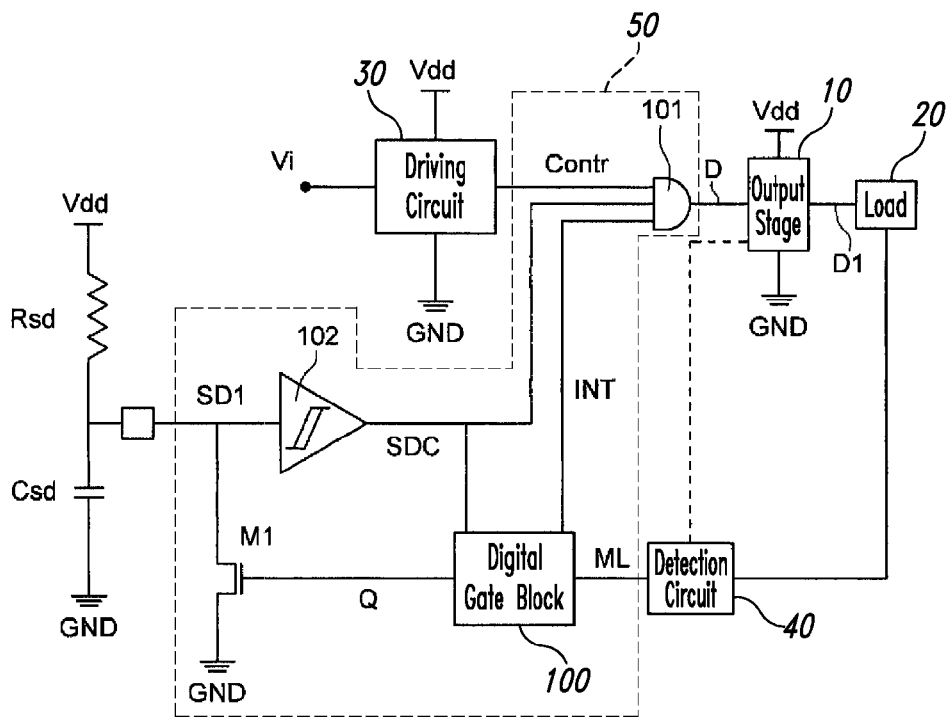
FIG. 2 shows a scheme of an electronic circuit provided with a protection device in accordance with a non-limiting embodiment of the present invention.

FIG. 2 shows an electronic circuit including an output switching stage 10 arranged between a power voltage and a ground GND and adapted to drive a load 20 with a signal D1. The output stage 10 is driven by a driving circuit 30 having at least one input signal Vi and connected to the power voltage Vdd and to ground GND. The circuit 30 is adapted to control the output stage 10 in response to the at least one input signal Vi. The electronic circuit includes a circuit 40 for detecting a fault either of the output stage 10 or of the load 20, and further includes a protection device 50 that protects the electronic circuit against a fault. Said protection device is adapted to determine the shutdown, or deactivation, of the output stage 10 in response to the detection of a fault by the detection circuit 40. The output stage 10 is preferably a power stage of the switching type. Preferably, the power stage 10 includes a half-bridge or transistor bridge for driving the load 20. A fault may be caused by an overcurrent, an overvoltage, or an excessive temperature either in the output stage 10 or in the load 20. The circuit 40 may detect at least said types of faults.

The protection device 50 includes digital means 100, 101 configured to minimize the intervention time Tint between the detection of the fault and the shutdown of the output stage 10, i.e., between the reception of a signal indicating the detection of a fault and the shutdown of the output stage 10. The intervention time Tint by using the digital means 100, 101 is of the order of logic circuitry switching times (for example, a few tens of nanoseconds), and absolutely lower than a hundred of milliseconds. More precisely, the protection device has an input signal ML from the detector 40 and includes an AND gate 101 having the input signal Contr from the driving circuit 30 and a digital gate block 100 receiving the input signal ML and adapted to send a signal INT at a low logical level, i.e., at a substantially zero voltage or at ground GND, to the AND gate 101 in presence of a fault detected with a signal ML at a high logical level, i.e., at a voltage value substantially equal to the voltage Vdd. The value at the low logical level of the signal INT, which is normally at a high logical level, switches the input signal D at the output stage 10 to low logical level, thus shutting down the output stage 10, specifically if the output stage is of the switching type, by disabling the transistors of the output switching stage. The detector 40 may include an overcurrent detector, e.g., a sensing resistor, and a comparator which compares the current value across said sensing resistor with a reference current value and which emits the signal ML at a high logical level, substantially at the power voltage value Vdd, when the value of the current across the sensing resistor exceeds the reference current value.

Preferably, the block 100 is adapted to send a signal Q at a high logical level opposite to the logical level of the signal INT to a transistor M1, preferably a MOS transistor, having its drain terminal connected to a terminal SD1 and its source terminal connected to ground GND. The terminal SD1 is the input terminal of a hysteresis comparator 102 connected to the voltage Vdd by means of a resistor Rsd and to a ground by means of a capacitor Csd. Both the resistor Rsd and the capacitor Csd belong to a network outside the protection device 50, while both the transistor M1 and the comparator 102 belong to the protection device 50. The circuit part including the transistor M1, the external network with the resistor Rsd and the capacitor Csd. The hysteresis comparator 102 is able to, by sending a signal SDC to the AND gate 101, maintain the shutdown of the output stage 10 for a time interval Td which can be fixed at will and according to the values of the resistor Rsd and of the capacitor Csd.

Figure 5:
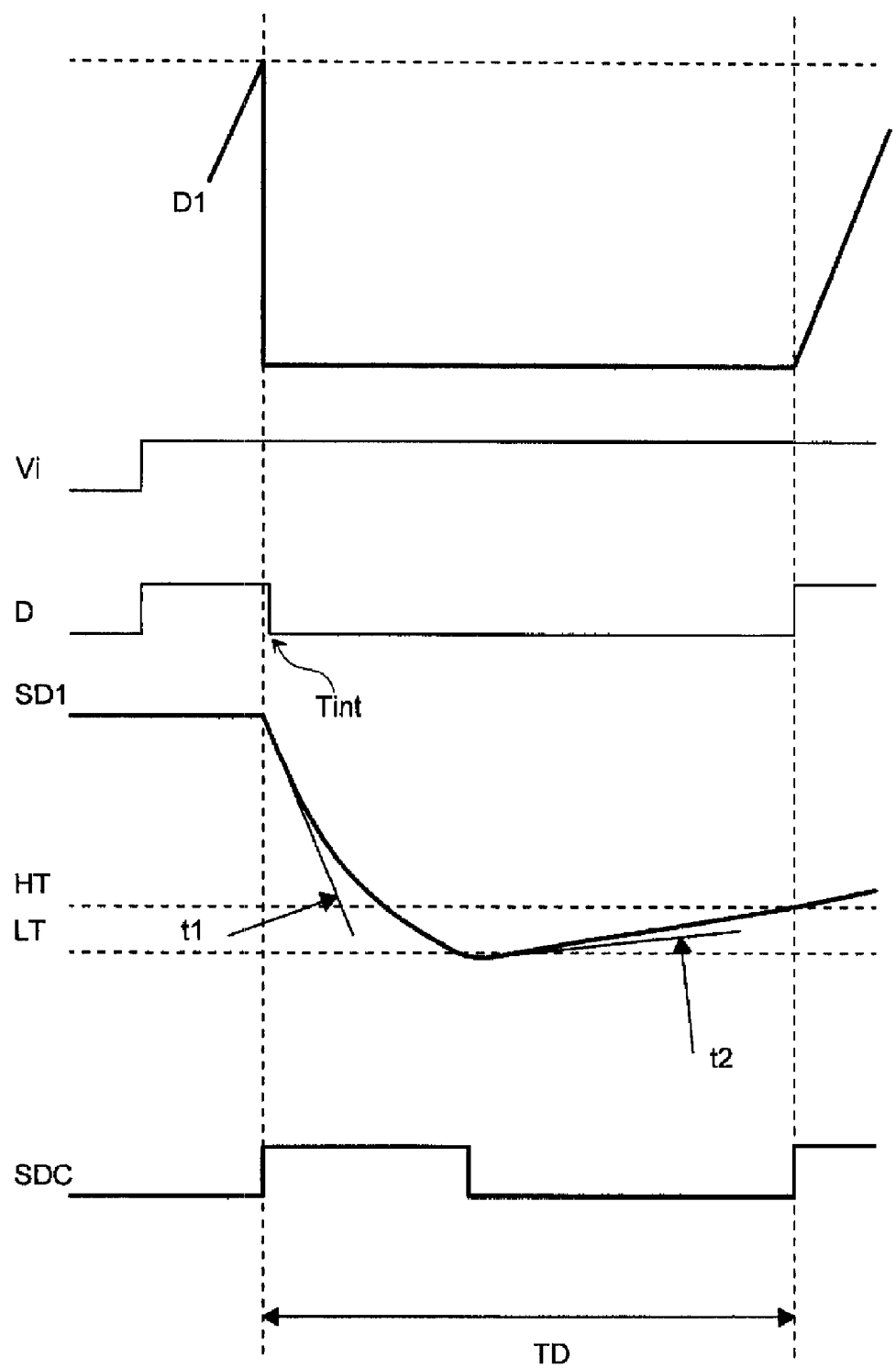
FIG. 5 shows time diagrams related to the signals used in the circuit of FIG. 2 in accordance with a non-limiting embodiment of the present invention.

When the signal INT is present to shut down the output stage 10, the signal Q switches the MOS transistor M1 on. The signal SD1, which is a voltage signal, will start lowering proportionally according to a time constant $t1=Ron\_M1*Csd$, wherein Ron_M1 indicates the switch-on resistance of the transistor M1, as shown in FIG. 5, which also shows the time diagrams of the signals D1, Vi, D and SDC. The signal SD1 will fall under the upper threshold HT of the hysteresis until it reaches the lower threshold LT. Once the lower threshold LT has been reached, the comparator 102 changes status by modifying the output signal SDC, from a high logical level, substantially the power voltage Vdd, to switch to a low logical level, substantially zero voltage or ground GND.

The signal SDC is also sent to the block 100 to change the status of the signal Q, from high to low, and consequently shut down the MOS transistor M1. In such a manner, the voltage signal SD1 starts increasing proportionally according to a time constant $t2=Rsd*Csd$. When the signal SD1 exceeds the upper threshold HT due to the increase, the comparator 102 changes the status thus modifying the output signal SDC, switching from the low logical level to the high logical level. In such a manner, even if the fault ceases with the consequent change of status of the signal INT, the signal D is maintained at the low logic level by the signal SDC. Furthermore, the shutdown time will last for the time interval Td, which may be varied at will by varying the components Rsd and Csd of the external network.

Figure 3:
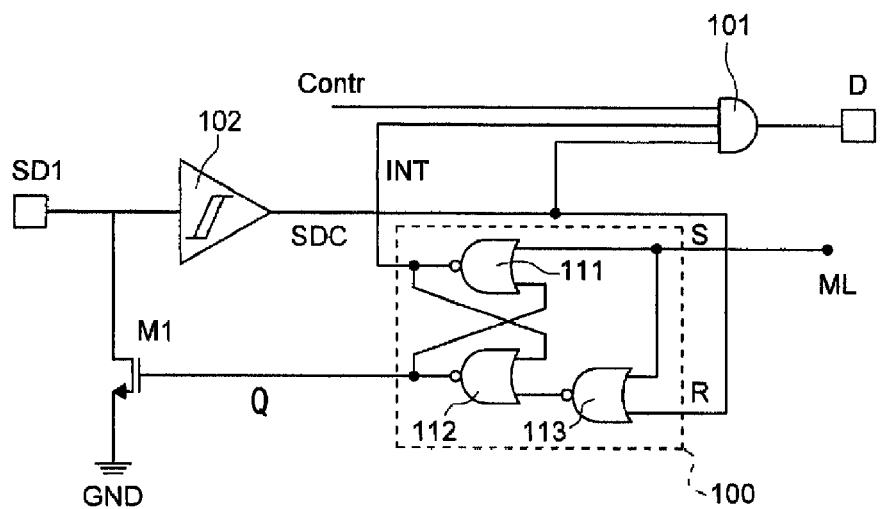
FIG. 3 shows the protection device in FIG. 2 in more detail in accordance with a non-limiting embodiment of the present invention.

FIG. 3 shows more in detail a possible embodiment of the circuit block 100 in FIG. 2. The block 100 includes a set-reset flip-flop with dominating set. The block 100 includes a first NOR gate 111 having the input signal ML at the set terminal S and being adapted to provide the signal INT, a second NOR gate 113 having the input signal SDC at the reset terminal R and the input signal ML at another terminal, and a last NOR gate 112 having the input signal outputted by the NOR gate 113 and the input signal INT, and being adapted to provide the signal Q, which in turn is inputted to the NOR gate 111.

With a circuit block 100 made according to this manner, the oscillations of the terminal on which the signal SD1 insists are avoided when the signal ML remains stable at the high level.

Furthermore, the direct connection of the terminal on which the signal SD1 insists to the AND gate 101 and to the AND gate consisting of the NOR gates 112 and 113 provides a terminal for driving the output stage 10.

Figure 4:
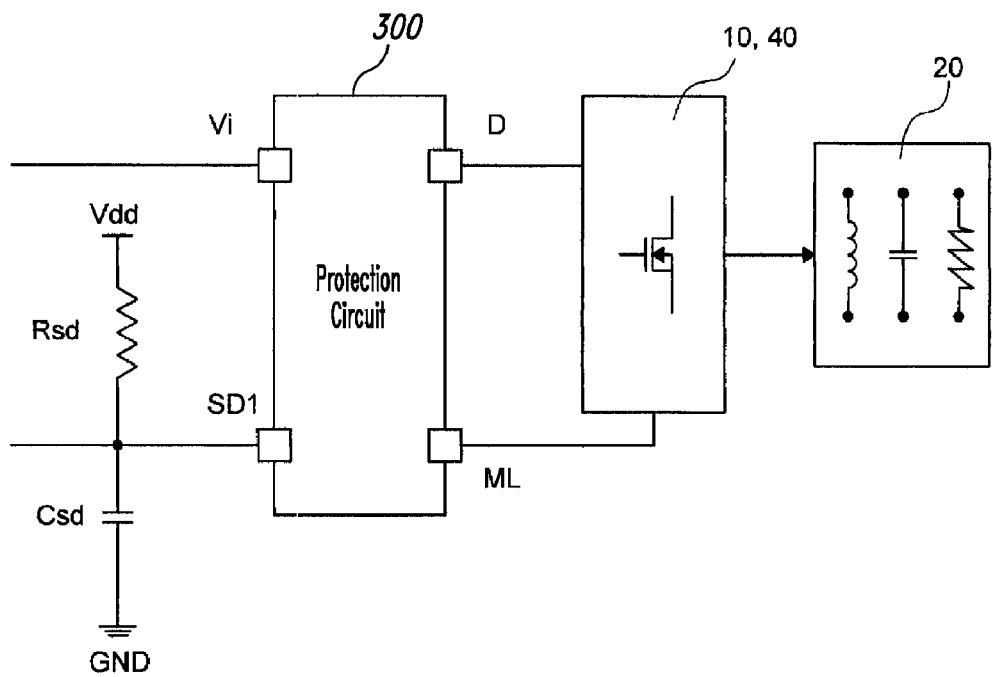
FIG. 4 shows an integrated electronic circuit with a power stage and a protection device with driving circuit which are integrated in accordance with a non-limiting embodiment of the present invention.

The protection device may be integrated with the driving circuit 30, forming a circuit 300 having the input signals ML, Vi and SD1 and providing the signal D for driving the output stage 10, as shown in FIG. 4.

Figure 1:
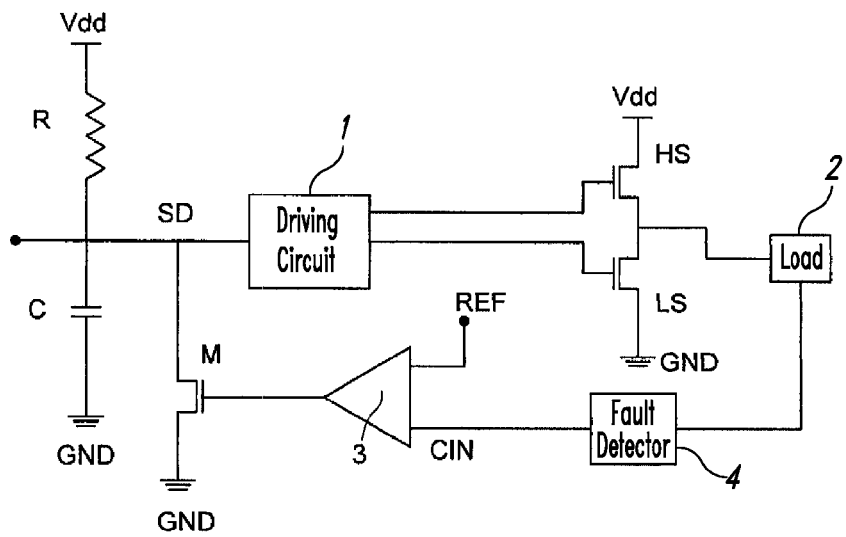
FIG. 1 shows a scheme of an electronic circuitry with a protection device in accordance with the known art.

By means of the protection device 50, it is possible to minimize the delay between the detection of the fault and the shutdown of the output stage 10. Indeed, the intervention time period Tint between receiving the signal ML and sending the signal D is of the order of logic circuitry switching times. In contrast, by means of the device of the known art (see FIG. 1) the time delay is of the order of tens of microseconds because such a device depends on the time constant $t=Ron\_M*C$, wherein Ron_M is the switch-on resistance of the transistor M. In such a manner, it is possible to increase the time interval Td to the desired value by simply increasing the value of the capacitor Csd, without the occurrence of the problems disclosed above with regard to the device in FIG. 1.

Since it does not depend on a latch device, the terminal on which the signal SD1 insists may be used to drive the output stage 10 and, in some systems where the fault detector 40 consists of a current detector, the faulting signal ML may be used as a current peak detector by setting a fixed shutdown period by means of the capacitor Csd on the terminal on which the signal SD1 insists.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for protecting an electronic circuit against a fault, said electronic circuit including an output stage for driving a load and a driving circuit for driving said output stage, the driving circuit being configured to produce a drive signal for driving a power output in response to at least one input signal, said device comprising:

an input terminal configured to receive a detection signal representative of a detection of a fault either of the load or of the output stage;

a digital deactivation circuit configured to deactivate the output stage within an intervention time between the detection of the fault and the deactivation of the output stage that is on an order of logic circuitry switching times, the digital deactivation circuit including:

a first gating circuit having a first input configured to receive the drive signal, a second input configured to receive a control signal, and an output configured to activate and deactivate the output stage based on the drive signal and the control signal; and a hysteresis comparator having an input and an output, the hysteresis comparator being configured to provide an output signal;

a second gating circuit having a first input coupled to the input terminal, a second input coupled to the output of the hysteresis comparator, and an output coupled to the second input of the first gating circuit, the second gating circuit being configured to provide the control signal to the first gating circuit; and a transistor having a first conduction terminal coupled to the input of said hysteresis comparator, a second conduction terminal coupled to a voltage reference terminal, and a control terminal coupled to the second gating circuit, said transistor being configured to provide a current path between the input of the hysteresis comparator and the voltage reference terminal with the transistor switched on, said second gating circuit being configured to maintain said transistor normally off and configured to switch the transistor on in response to said detection signal.

2. The device according to claim 1 wherein said first gating circuit includes an AND gate having inputs coupled to receive the driving and control signals and an output configured to be coupled to the output stage.

3. The device according to claim 1, wherein the hysteresis comparator is configured to extend a shutdown time of the output stage after the detection of the fault in accordance with a time interval desired by a user.

4. The device according to claim 1 wherein said first gating circuit includes a third input configured to receive the output signal from the hysteresis comparator, and provide a shutdown signal to the output stage if one of the received signals is at a selected logical level.

5. The device according to claim 4, wherein:
said first gating circuit includes an AND gate,
said second gating circuit includes a set-reset flip-flop with dominant set, the flip-flop having a set input configured to receive the detection signal and a reset input configured to receive the output signal of the hysteresis comparator.

6. The device according to claim 1 wherein said electronic circuit includes a device for detecting the fault in either the load or the output stage and which is configured to provide said detection signal representative of the fault.

7. The device according to claim 1 wherein said output stage is of a switching type.

8. An integrated circuit for protecting an electronic circuit against a fault, said electronic circuit including an output stage for driving a load, the integrated circuit comprising:

a driving circuit for driving said output stage, the driving circuit being configured to produce a drive signal in response to at least one input signal;

a protection device configured to deactivate the output stage in response to a detection signal representative of a detection of a fault either of the load or of the output stage, the protection device including digital means for deactivating the output stage within an intervention time between the detection of the fault and the shutdown of the output stage that is shorter than 100 nanoseconds, the digital means being positioned between the driving circuit and the output stage, wherein the digital means includes:

a gating circuit having a first input configured to receive the drive signal, a second input configured to receive a control signal, and an output configured to activate and deactivate the output stage based on the drive signal and control signal; and control means for producing the control signal in response to the detection signal; and a hysteresis comparator having an input terminal drivable from outside, said hysteresis comparator being configured to provide an output signal to said control means and to a third input of the gating circuit, said control means including means for producing the control signal in response to the output signal of the hysteresis comparator and the gating circuit being configured to switch on or off said output stage according to a value of said output signal from the hysteresis comparator.

9. The integrated circuit according to claim 8 wherein said gating circuit includes an AND gate having inputs coupled to receive the drive and control signals and an output configured to be coupled to the output stage.

10. A system, comprising:
a circuit configured to drive a load, the circuit being configured to receive an input signal and having a driving circuit and an output stage, the driving circuit being configured to generate a driving signal for driving the output stage responsive to the input signal, the output stage being configured to drive the load when activated;

a fault detector configured to be coupled to at least the load and configured to generate a fault signal responsive to detection of a fault in the load; and a protection device coupled to the output stage and the fault detector, the protection device being configured to, responsive to the fault signal, generate a first signal to deactivate the output stage and a second signal to cause the output stage to remain deactivated for substantially a particular duration, wherein the protection device comprises a set-reset flip-flop coupled to receive the fault signal from the fault detector and configured to provide the first and second signals, wherein the protection device includes a hysteresis comparator and a switching element, the hysteresis comparator having an input terminal, the switching element being coupled between the input terminal of the hysteresis comparator and a reference voltage terminal and having a control terminal coupled to receive the second signal from the set-reset flip-flop.

11. The system of claim 10 wherein a response time between the detection of the fault and deactivation of the output stage is of the order of a few tens of nanoseconds.

12. The system of claim 10 wherein the particular duration for which the output stage remains deactivated after the detection of the fault is adjustable.

13. The system of claim 10 wherein the fault detector is configured to detect at least one of overcurrent, overvoltage, and excessive temperature conditions.

14. The system of claim 10, further comprising a resistive element and a capacitive element that are coupled between the voltage reference and a supply voltage and are coupled to each other at a node that is coupled to the input terminal of the hysteresis comparator.

15. The system of claim 10 wherein the protection device further comprises a logic AND gate coupled to receive the first signal from the set-reset flip-flop, a signal from the hysteresis comparator, and the driving signal from the driving circuit to generate a signal to drive the output stage.

16. A protection device for protecting an electronic circuit against a fault, said electronic circuit including an output stage for driving a load and a driving circuit for driving said output stage, the driving circuit being configured to produce a drive signal for driving a power output in response to at least one input signal, said protection device comprising:
    means for receiving a detection signal representative of the detection of a fault either of the load or of the output stage;
    digital means for deactivating the output stage within an intervention time between the detection of the fault and the shutdown of the output stage that is shorter than 100 nanoseconds; and
    means for extending a shutdown time of the output stage after the detection of the fault in accordance with a time interval desired by a user, the means for extending a shutdown time including:
        a hysteresis comparator configured to provide an output signal to an input of said digital means;
        a transistor having a terminal in common with an input terminal of said hysteresis comparator and a terminal coupled to ground, said transistor being configured to obtain a current path between the input terminal of the hysteresis comparator and the ground when the transistor is on, said transistor being switched on by said digital means in presence of the detection of the fault.

17. The protection device of claim 16, further comprising a network coupled to a reference voltage and configured to drive the input terminal of said hysteresis comparator, the network including a resistor and a capacitor, said network being configured to provide an input signal to the hysteresis comparator that exponentially decreases according to a first time constant that depends on a switching-on resistance of the transistor and on said capacitor of said network until a lower threshold of the hysteresis comparator is reached and exponentially increases according to a second time constant that depends on the resistor and on the capacitor of the network until an upper threshold of the hysteresis comparator is reached.

18. A device for protecting an electronic circuit against a fault, said electronic circuit including an output stage for driving a load and a driving circuit for driving said output stage, the driving circuit being configured to produce a drive signal for driving a power output in response to at least one input signal, said protection device comprising:
    means for receiving a detection signal representative of the detection of a fault either of the load or of the output stage;
    digital means for deactivating the output stage within an intervention time between the detection of the fault and the shutdown of the output stage that is shorter than 100 nanoseconds, wherein the digital means include:
        a gating circuit having a first input configured to receive the drive signal, a second input configured to receive a control signal, a third input, and an output configured to activate and deactivate the output stage based on the drive signal and control signal; and
        control means for producing the control signal in response to the detection signal; and
        a hysteresis comparator having an input terminal drivable from outside, said hysteresis comparator being configured to provide an output signal to an input of said control means and to a third input of the gating circuit, said control means including means for producing the control signal according to a value of said output signal from the hysteresis comparator, wherein said control means include means for providing the control signal at a low logical level in response to the detection of the fault, and wherein the gating circuit is configured to provide a shutdown signal to the output stage if one of the drive signal, control signal, and output signal is at a low logical level.

19. The device of claim 18, wherein said gating circuit includes an AND gate, and said control means includes a set-reset flip-flop with dominant set, and wherein a set signal to the flip-flop is the detection signal representative of the fault and a reset signal to the flip-flop is the output signal of the hysteresis comparator.

20. The device of claim 19, further comprising a transistor having a first terminal in common with the input terminal of said hysteresis comparator and a second terminal coupled to ground, said transistor being configured to obtain a current path between the input terminal of the hysteresis comparator and the ground when the transistor is on, said flip-flop being configured to switch on said transistor in response to the detection signal.

* * * * *